Dec. 15, 1964    R. C. DU BOIS    3,161,057

THERMOMETERS

Filed Nov. 20, 1962

INVENTOR.
ROBERT C. Du BOIS
BY M W Goodwin
ATTORNEY

United States Patent Office 3,161,057
Patented Dec. 15, 1964

3,161,057
THERMOMETERS
Robert C. Du Bois, Fairfield, Conn., assignor to Manning, Maxwell & Moore, Incorporated, Stratford, Conn., a corporation of New Jersey
Filed Nov. 20, 1962, Ser. No. 238,955
5 Claims. (Cl. 73—363.9)

This invention relates to bimetal instruments, and, more particularly, to thermometers of the class referred to as bimetal thermometers.

A typical bimetal thermometer of a type of which this invention is concerned comprises an elongated cylindrical housing or stem in which is contained an elongated coil formed from a bimetallic strip. One end of the coil is fixed to a shaft which extends coaxially of, and is mounted for rotation relative to, the stem. In the more common configurations of bimetallic thermometers of the type just described, the shaft mounts a pointer contained within a dial housing which also contains a dial, whereby the pointer will be moved over the dial in response to temperature changes sensed by the bimetallic coil. In thermometers of this general class, it is desirable to provide means for recalibration. While means have heretofore been provided for recalibrating such thermometers, the methods used are in some cases too costly and complex. Also, such thermometers more or less conventionally use a flat dial. While such a dial and pointer arrangement may be readily viewed and read from the front of the dial, it cannot easily be read when the viewer is at an angle to the sides of the dial and in most cases cannot be read at all from extreme angles.

Accordingly, it is the object of this invention to provide a novel and improved thermometer of the bimetal type which can be read not only from the front of the dial, but also from the sides thereof and which incorporates a simple and inexpensive yet effective means for recalibration of the instrument.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
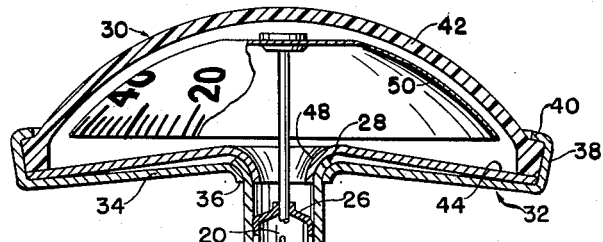
FIG. 1 is a longitudinal cross sectional view of a bi-metallic thermometer constructed in accordance with the present invention.
Figure 3:
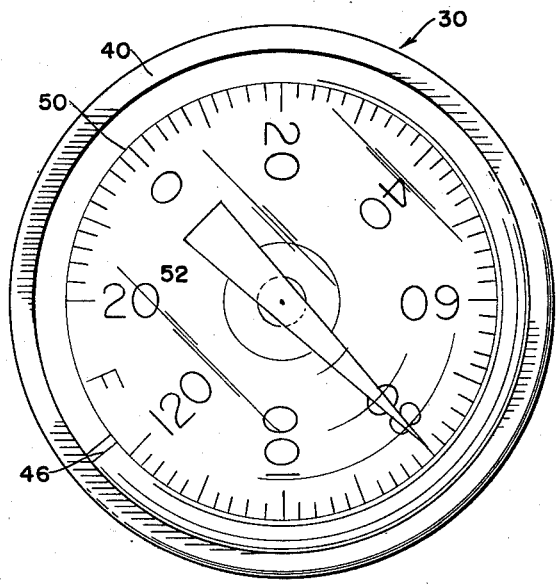
FIG. 3 is a top plan view of the thermometer of FIG. 1.

With reference to the drawing, and particularly FIGS. 1 and 3 thereof, a bimetal thermometer incorporating the present invention comprises an elongated cylindrical stem 10 closed at one end by a plug 12. Disposed within the stem 10 and extending coaxially thereof, is an elongated bimetal coil 14 formed from a strip of bimetallic material. Extending coaxially into the coil 14 is one end of a rod or shaft 16. The shaft 16 extends through the coil 14 and is rotatably supported at its lower end in suitable bearing means on the plug 12. One end of the coil 14 is suitably fixed to the plug 12, such as by spot welding at 18. The other end of the coil is suitably fixed to the shaft 16 at a point intermediate the ends of the shaft. The shaft is also rotatably supported at a point spaced between the inner end of the coil 14 and upper end of the housing 10 by suitable additional bearing means such as a bushing 20.

The bushing 20 comprises a generally cylindrical skirt portion 22. The skirt 22 is provided with a plurality of slots 24 extending longitudinally of the skirt from the bottom lower end thereof and terminating short of the front end of the skirt. Prior to assembly of the bushing 20 in the stem, the portions of the skirt 22 between the slots 24 are inclined outwardly. During assembly these inclined portions are resiliently deformed inwardly by the wall of the stem so that the bushing is firmly held in place within the stem. The skirt 22 terminates at its upper end in a generally dome shaped portion 26. The dome shaped portion 26 is provided with a central, generally cylindrical, extension forming an aperture through which the shaft 16 extends. The inner diameter of this cylindrical extension or projection is dimensioned so that the shaft 16 is rotatably engaged by the inner wall of the extension to provide a friction bearing for the shaft.

As can be seen from FIG. 1, the upper end of the stem 10 terminates in an outwardly flared portion 28, having outer and inner surfaces which curve longitudinally and outwardly of the housing. Mounted on the flared end 28 of the stem is a dial housing generally indicated at 30. The dial housing comprises a base, generally indicated at 32, and including a generally conically shaped bottom wall 34 which slopes outwardly of the stem and toward the other end thereof. The base 32 has a central, outwardly flared, projection on which is supported the outwardly flared end 28 of the stem 10. More specifically, the inner wall or surface of the outwardly flared portion 36 of the base 32 is curved complementally to, and is in engagement in nesting relation with the outer curved surface of the flared end of the stem. The outer edge of the base 34 terminates in an upstanding ring-like rim or outer wall which in turn terminates in a radially inwardly extending lip 40. The ring 38 and lip 40 form a bezel retaining a partispherical transparent cover 42. Around its outer perimeter the cover 42 is provided with in integral enlarged portion having an annular surface in underlying clamped engagement with the lip 40. This enlarged portion of the cover also has an outer generally frusto-conical surface juxtaposed with the correspondingly shaped inner wall of the ring 38. The outer edge portion of the cover further has a second annular surface underlying the first-mentioned annular surface and which rests on a resilient washer-like retaining member 44.

Figure 4:
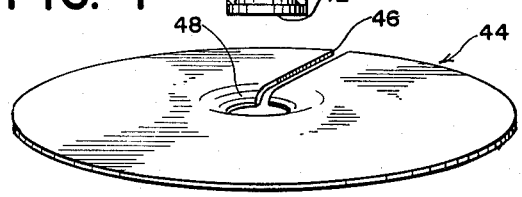
FIG. 4 is an isometric view of an element of the thermometer of FIG. 1.

As shown in FIG. 4, the retaining member 44 prior to assembly in the thermometer is generally flat and of circular configuration. The retaining member or disc 44 is provided with a radial slot 46 extending from the outer diameter of the disc and terminating at its inner end at a central opening in the disc formed by an integral, outwardly fired tubular portion 48. The flared projection 48 has an outer surface which is curved complementary to the inner surface of the flared end 28 of the stem and is engaged therewith in nesting relation.

Figure 2:
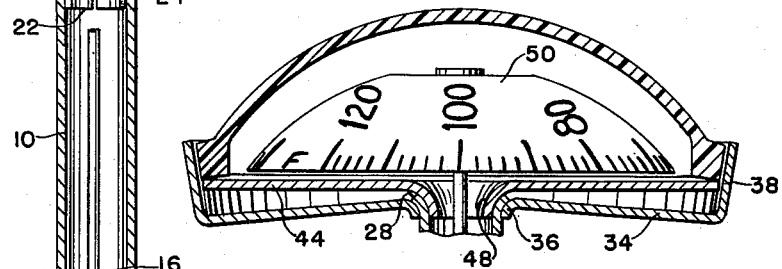
FIG. 2 is a fragmentary cross-sectional view of the dial housing of the thermometer of FIG. 1 prior to final assembly thereof.

In the assembly of the instrument, the lower end of the stem 10 is inserted through the central flared opening in the base 34 until the complementally shaped surfaces of the flared end 28 and flared projection 36 are in engagement, as shown in FIG. 2. The retaining member 44 is then located with its flared projection 48 seated within the flared projection 28 on the stem 10, also as shown in FIG. 2. The cover 42 is subsequently seated on the retaining member 44. At this time, the rim 38 of the base 32 is not turned over to form the lip 40. The entire assembly 30 is then compressed axially to move the cover 42 toward the base 32 and correspondingly deform the resilient retaining member 44, as shown in FIG. 1, until the outer edge of the retaining member is in engagement with the bottom wall 34 of the base 32. The upper end of the rim 38 of the base is then turned over to form the lip 40 and thus clampingly retain the cover 42 and retaining member 44 in the position shown in FIG. 1. While the flared portions 28, 36 and 48 heretofore described may provide a relatively loose fit when the elements are in the initial assembly stage, shown in FIG. 2, during final assembly of the instrument, the attendant deformation of the resilient retaining member 44 will result in the flared portion of the disc firmly clamping the flared portion 28 of the stem to the flared portion 36 of the housing 30. In this manner, the housing 30 is retained on the stem 10 with sufficient force to provide a firm assembly of these parts, while at the same time permitting relative angular movement between the housing 30 and stem 10 about the axis of the shaft 16.

Contained within the housing 30 is a dial 50. The upper end of the shaft 16 projects into the housing and is connected at its outer end to the dial 50 for rotation therewith. The dial 50 has a partispherical side wall providing a partispherical outer surface which is curved generally complementary to the curavture of the cover 42 and is spaced slightly therefrom. As shown in FIGS. 1 to 3, the outer spherical surface of the dial 50 is provided with a plurality of indicia spaced angularly about the dial, and in the particular embodiment shown, indicating degrees of temperature in the Fahrenheit scale. As shown in FIG. 3, the cover 42 is provided with an opaque area in the shape of a reference mark or pointer 52. The pointer 52 may be printed, painted or otherwise suitably placed on the cover 42 and thus is, of course, fixed relative thereto.

As should be apparent from the foregoing, in response to a change in the ambient temperature of the bimetal coil 14, the shaft 16 and thus the dial 50 will be angularly moved about the axis of the shaft and relative to the pointer 52. In order initially to calibrate the instrument, the bimetal is exposed to a known temperature for a time sufficient to stabilize the bimetal. The cover assembly 30 is then moved about the axis of the shaft 16 until the proper indicia on the dial is in register with the pointer 52. The frictional retention of the housing 30 and stem 10 provides sufficient force to retain these elements in their set position, notwithstanding reasonably rough treatment or vibration of the instrument. However, should the instrument go out of calibration, either through extended usage or adverse operating conditions, it may easily be recalibrated simply by repeating the steps described above in connection with initial calibration.

It will also be observed that the particular shape of the dial and cover of the instrument permits reading of the instrument not only from the front thereof, but also from extreme side angles up to and including positions at right angles to the shaft 16. It will be observed that the shaft 16 is journaled at two widely spaced points, corresponding generally to the opposite ends of the stem 10, thereby tending to eliminate any lateral movement of the shaft 16 relative to the stem and tending to reduce any damage to the instrument due to vibration or shock.

Inasmuch as many changes could be made in the above construction and many widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

I claim:

1. In a bimetal instrument of the type having an elongated tubular stem containing a bimetal coil anchored at one end relative to the stem, a housing at one end of the stem, including a base, said base including a bottom wall having a central tubular portion which projects outwardly of the housing, said one end of the stem being received within said tubular portion, and a disc of resilient material disposed within said housing, the outer edge portion of the disc being clamped to the outer edge portion of said bottom wall, said disc having a portion in overlying engagement with said one end of the stem, said one end of the stem and said tubular portions of the base having nested generally conical portions whereby the base and stem may be relatively rotated about the axes of said conical portions, the disc being flat in its free state but in assembly as described being deformed to a generally conical shape whereby the disc slopes from said one end of the stem toward the opposite end of the stem, said disc exerting a resilient clamping force on the nested portions of the stem and housing sufficient to retain the stem and housing in selected position angularly about the axes of said conical portions, but insufficient to preclude manual selective angular adjustment of the housing relative to the stem.

2. In a bimetal instrument of the type having an elongated tubular stem containing a bimetal coil anchored at one end relative to the stem, a housing at one end of the stem and including a cover and a base, means within the housing connected to the other end of said coil, said base including a bottom wall having a central tubular portion projecting outwardly of the housing which has an inner smooth curved surface flaring inwardly of the housing, said one end of the stem being engaged within said tubular portion and being flared outwardly of the stem in complementary relation to said inner surface of said tubular portion, and a disc of resilient material disposed within said housing in overlying relation to said base, means clamping the outer edge portion of the disc into engagement with said bottom wall, said disc having a central tubular portion projecting inwardly of said one end of the stem and having an outer smooth curved surface complementally engaging the inner flared surface of said one end of the stem, said disc having a radial slot extending from said tubular projection thereof to its outer edge and being flat in its free state but in assembly as described being deformed to a generally conical shape whereby the disc slopes from said tubular projection thereof toward the end of said stem opposite said one end thereof, said disc exerting a clamping force on the overlying flared portions of the stem and housing sufficient to retain the stem and housing in selected position angularly about the longitudinal axis of said stem but insufficient to preclude manual selective angular adjustment of the housing relative to the stem.

3. In a bimetal instrument of the type having an elongated tubular stem containing a bimetal coil anchored at one end relative to the stem, a housing mounted on one end of said stem and including a cover and a base, means within the housing connected to the other end of said coil, said base including a bottom wall having a central tubular portion which projects outwardly of the housing and has an inner smooth curved surface flaring inwardly of the housing, said one end of the stem being engaged within said tubular portion and being flared outwardly of the stem in complementary relation to said inner surface of said tubular portion, said base further having a ring-like portion extending from the perimeter of said bottom wall and terminating in an inturned retaining lip overlying the perimeter of said cover, and a disc of resilient material disposed within said housing with its outer edge portion being clamped between the outer edge portion of said cover and said bottom wall, said disc having a central tubular portion projecting inwardly of said one end of the stem and having an outer smooth curved surface complementally engaging the inner flared surface of said one end of the stem, said disc having a radial slot extending from said tubular projection thereof to its outer edge and being flat in its free state but in assembly as described being deformed to a generally conical shape whereby the disc slopes from said tubular projection thereof toward the end of said stem opposite said one end thereof, said disc exerting a clamping force on the overlying flared portions of the stem and housing sufficient to retain the stem and housing in selected position angularly about the axes of said projections but insufficient to preclude manual selective angular adjustment of the housing relative to the stem.

4. In a bimetal thermometer of the type having an elongated tubular stem containing a bimetal coil anchored at one end relative to the stem and at its other end connected in driving relation to a rotatable shaft, one end of the shaft extending outwardly of one end of the stem and mounting for rotation therewith a dial member having an indicia bearing surface extending angularly of the axis of said shaft and facing away from said axis, a dial housing including a transparent cover and a base, said cover being shaped generally complementally to said indicia bearing surface of the dial member and having a fixed reference indicator thereon and overlying said indicia bearing surface, said base including a bottom wall having a central tubular portion which projects outwardly of the dial housing said one end of the stem being engaged within said tubular portion, said base further having a ring-like portion extending from the perimeter of said bottom wall and terminating in an inturned retaining lip overlying the perimeter of said cover, and a disc of resilient material disposed within said housing with its outer edge portion being clamped between the outer edge portion of said cover and said bottom wall, said disc having a central portion projecting in overlying engagement with said one end of the stem, said one end of the stem and said tubular portions of the base including overlying nesting generally conical portions whereby said stem and base may be relatively rotated about said shaft axis, said disc having a radial slot extending from said tubular projection thereof to its outer edge and being flat in its free state but in assembly as described being deformed to a generally conical shape whereby the disc slopes from said one end of the stem toward the opposite end thereof, said disc exerting a clamping force on the overlying nested portions of the stem and dial housing sufficient to retain the stem and dial housing in selected position angularly about the axis of said shaft but insufficient to preclude manual selective angular adjustment of the dial housing relative to the stem and about the shaft axis.

5. In a bimetal thermometer of the type having an elongated tubular stem containing a bimetal coil anchored at one end relative to the stem and at its other end connected in driving relation to a rotatable shaft, one end of the shaft extending outwardly of one end of the stem, the other end of the stem being closed by a plug, the other end of the shaft being rotatably supported by means as said plug, additional bearing means for said shaft disposed closely adjacent to said one end of the stem, said one end of the shaft mounting for rotation therewith a dial member having an outer partispherical indicia bearing surface disposed concentrically of and facing generally outwardly of and away from said one end of said stem, a dial housing including a transparent cover and a base, said cover being shaped generally complementary to said indicia bearing surface of the dial member and having a fixed reference indicator thereon and overlying said indicia bearing surface, said base including a bottom wall having a central tubular portion which projects outwardly of the dial housing and has an inner smoother curved surface flaring inwardly of the dial housing, said one end of the stem being engaged within said tubular portion and being flared outwardly of the stem in complementary relation to said inner surface of said tubular portion, said base further having a ring-like portion extending from the perimeter of said bottom wall and terminating in an inturned retaining lip overlying the perimeter of said cover, and a disc of resilient material disposed within said housing with its outer edge portion being clamped between the outer edge portion of said cover and said bottom wall, said disc having a central tubular portion projecting inwardly of said one end of the stem and having an outer smooth curved surface complementary engaging the inner flared surface of said one end of the stem, said disc having a radial slot extending from said tubular projection thereof to its outer edge and being flat in its free state but in assembly as described being deformed to a generally conical shape wherein the disc slopes from said tubular projection thereof toward the end of said stem opposite said one end thereof, said disc exerting a clamping force on the overlying flared portions of the stem and dial housing sufficient to retain the stem and dial housing in selected position angularly about the axis of said shaft but insufficient to preclude manual selective angular adjustment of the dial housing relative to the stem and about the shaft axis.

No references cited.